United States Patent [19]

Ruddy

[11] Patent Number: 4,808,271
[45] Date of Patent: Feb. 28, 1989

[54] ELECTROPLATING METHOD FOR PRODUCING ULTRALOW-MASS FISSIONABLE DEPOSITS

[75] Inventor: Francis H. Ruddy, Monroeville, Pa.

[73] Assignee: The United States of America as represented by the United States Department of Energy, Washington, D.C.

[21] Appl. No.: 897,554

[22] Filed: Aug. 18, 1986

[51] Int. Cl.$^4$ ............................ G01T 3/00; C25C 1/22; C25D 3/54
[52] U.S. Cl. .................................... 204/1.5; 376/153; 376/154; 376/254; 250/390.03
[58] Field of Search ................ 204/1.5; 376/153, 154, 376/254; 250/390, 391, 392, 390.03

[56] References Cited

U.S. PATENT DOCUMENTS

| | | | |
|---|---|---|---|
| 2,805,985 | 9/1957 | Wolter | 204/1.5 |
| 2,833,617 | 5/1958 | Seaborg et al. | 23/14.5 |
| 2,908,621 | 10/1959 | Segre et al. | 423/251 X |
| 2,951,018 | 8/1960 | Seaborg et al. | 204/1.5 |
| 2,975,113 | 3/1961 | Gordon | 204/154.2 |
| 3,000,697 | 9/1961 | Wahl | 23/14.5 |
| 3,044,944 | 7/1962 | Seaborg et al. | 204/154.2 |
| 3,190,804 | 6/1965 | Seaborg et al. | 176/16 |
| 3,360,477 | 12/1967 | Acree et al. | 252/644 |
| 3,742,274 | 6/1973 | O'Boyle et al. | 376/154 |
| 4,729,866 | 3/1988 | Ruddy et al. | 376/153 |

OTHER PUBLICATIONS

T. C. Liu and C. S. Su, "The Application of Fission Track Detectors as Reactor Neutron Temperature Monitor", *Int. J. Appl. Radiation and Isotopes*, vol. 22, p. 227 (1971).
*Handbook of Chemistry and Physics*, Weast, Ed., CRC Press, 56th Ed., Cleveland, OH, 1975, p. B-330.

*Primary Examiner*—John F. Terapane
*Assistant Examiner*—Virginia B. Caress
*Attorney, Agent, or Firm*—D. C. Abeles

[57] ABSTRACT

A method for producing ultralow-mass fissionable deposits for nuclear reactor dosimetry is described, including the steps of holding a radioactive parent until the radioactive parent reaches secular equilibrium with a daughter isotope, chemically separating the daughter from the parent, electroplating the daughter on a suitable substrate, and holding the electroplated daughter until the daughter decays to the fissionable deposit.

9 Claims, No Drawings

ELECTROPLATING METHOD FOR PRODUCING ULTRALOW-MASS FISSIONABLE DEPOSITS

BACKGROUND OF THE INVENTION

The invention which is the subject of this application was created under a contract with the U.S. Department of Energy.

This invention relates to preparation of fissionable deposits and, more particularly, to an electroplating method for producing ultralow-mass fissionable deposits for nuclear reactor dosimetry.

Ultralow-mass fissionable deposits have proved useful as fissioning sources for solid state track recorder fission rate measurements in high intensity neutron fields. These fission rate measurements are used to derive information for neutron dosimetry purposes.

More particularly, a solid state track recorder placed adjacent a thin fissionable deposit records tracks from the recoiling fission fragments which result from the fissions in the deposit. The number of these tracks observed with an optical microscope after chemical etching of the solid state track recorder is proportional to the number of fissions that has occurred in the fissionable deposit. Thus, the number of fission fragment tracks per square centimeter, i.e., the track density, in the solid state track recorder can be used to calculate the fission rate per unit area in the fissionable deposit.

For typical high neutron fluence applications, such as reactor core dosimetry or reactor component dosimetry, it has been found that a limitation is placed on the use of solid state track recorders due to the maximum track density that can be used, usually about $10^6$ tracks/cm$^2$, without excessive track overlap. In order to avoid excessively high track densities, low-mass fissionable deposits have been used to reduce the number of fissions that will occur at a given neutron fluence. For example, in dosimetry applications for light water reactor pressure vessel surveillance, $^{239}$Pu deposits with masses as low as $10^{-13}$ gram are required to produce a usable track density in the solid state track recorder. Similarly low masses of other isotopes such as $^{235}$U, $^{238}$U and $^{237}$Np are required for dosimetry in light water reactor pressure vessel surveillance.

It has been found that the technical problems associated with the manufacture of such low-mass deposits can be overcome by using isotopic spiking/electroplating techniques to characterize the masses of these fissionable deposits. For example, low-mass deposits can be produced by an electroplating technique using $^{237}$U (7 day half-life) as an isotopic spike for $^{235}$U and $^{238}$U, $^{239}$Np (2.4 day half-life) as a spike for $^{237}$Np, and $^{236}$Pu (2.85y half-life) as a spike for $^{239}$Pu. Typically, the shorter half-life isotopic spike is used as a chemical tracer to overcome the fact that the radioactivity of the respective fissionable deposit renders the principal isotope undetectable when present in such low masses as can be employed according to the present invention.

However, it has also been found that the amount of the isotopic spike that can be added to a fissionable deposit is limited by the nuclear properties of the particular isotopic spike chosen. For example, $^{237}$U decays to $^{237}$Np and $^{239}$Np decays to $^{239}$Pu, each of which is also fissionable. In both cases, the amount of the isotope to which the spike eventually decays must be kept small enough (by limiting the amount of spike added) to keep the fission rate of the isotope to which the spike decays small relative to the decay rate of the isotope of interest in the deposit.

In particular regard to $^{239}$Pu deposits, the $^{236}$Pu isotopic spike itself is fissionable and must therefore be used in limited amounts. In addition, for $^{239}$Pu deposits spiked with $^{236}$Pu, several experimental problems arise. For example, in the case of a solid state track recorder using $^{239}$Pu to measure the fission rate at the mid-plane location of the reactor cavity in the annular gap of an operating commercial power nuclear reactor during a typical operating cycle, a $^{239}$Pu fissionable deposit with a mass of about $10^{-10}$ gram is required to produce an optimum number of fission tracks. Namely, due to the previously explained spiking limitations, the maximum allowable $^{236}$Pu/$^{239}$Pu spike ratio for such a mass of the deposit results in a count rate that is only about 1 disintegration per minute (dpm).

In order to desirably characterize the decay rate of this deposit to better than 2% for mass calibration purposes, a relatively long counting time of about four days is required. Also, due to the low sample count rate, counters with very low background count rates (e.g., 0.1 dpm) must be used. However, the decay properties of the isotopic spike make maintenance of the low backgrounds difficult. For example, $^{236}$Pu decays as follows:

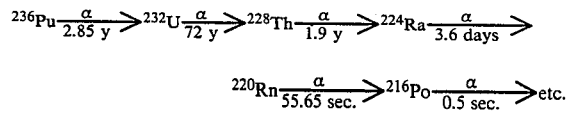

$$^{236}\text{Pu} \xrightarrow[2.85 \text{ y}]{\alpha} {}^{232}\text{U} \xrightarrow[72 \text{ y}]{\alpha} {}^{228}\text{Th} \xrightarrow[1.9 \text{ y}]{\alpha} {}^{224}\text{Ra} \xrightarrow[3.6 \text{ days}]{\alpha}$$

$$^{220}\text{Rn} \xrightarrow[55.65 \text{ sec.}]{\alpha} {}^{216}\text{Po} \xrightarrow[0.5 \text{ sec.}]{\alpha} \text{etc.}$$

Thus, many radioactive decay products accumulate from the decay of $^{236}$Pu, which must be periodically removed from the counters by cleaning to maintain low counter backgrounds.

On the other hand, when electroplating is employed to produce $^{237}$Np deposits, it has been found that a $^{239}$Np tracer can be obtained by milking a $^{243}$Am source, and this tracer material must be chemically equilibrated with the $^{237}$Np. The chemical equilibration, which requires a series of chemical oxidations and reductions using HBr and HNO$_3$, is necessary to ensure that the $^{237}$Np and $^{239}$Np are in the same equilibrium distribution of oxidation states and will therefore electroplate at the same rate, thusly guaranteeing that the $^{239}$Np/$^{237}$Np ratio is a constant. After characterization of the $^{237}$Np deposits via their $^{239}$Np beta activity, a measurement of the ratio of beta activity to $^{237}$Np alpha activity must be made to establish the mass scale for the deposits.

In light of the above, a simpler and more effective method is needed for producing ultralowmass fissionable deposits for nuclear reactor dosimetry.

SUMMARY OF THE INVENTION

Accordingly, it is an object of the present invention to provide an electroplating method for producing ultralow-mass fissionable deposits capable of easier deposit characterization.

It is another object of the present invention to provide a electroplating method for producing ultralow-mass fissionable deposits which are isotopically pure.

It is another object of the present invention to provide an electroplating method for producing ultralow-mass fissionable deposits wherein detector background is no longer a problem.

It is another object of the present invention to provide an electroplating method for producing ultralow-mass fissionable deposits wherein chemical equilibrium of tracers or spikes is unnecessary.

It is another object of the present invention to provide an electroplating method for producing ultralow-mass fissionable deposits capable of producing extremely low masses.

Finally, it is an object of the present invention to provide an electroplating method for producing ultralow-mass fissionable deposits capable of significant time savings in comparison with other methods.

To achieve the foregoing and other objects of the present invention, and in accordance with the purposes of the invention, there is provided a method for producing ultralow-mass fissionable deposits for reactor dosimetry, including the steps of holding a radioactive parent until the radioactive parent reaches secular equilibrium with a daughter formed thereby, chemically separating the daughter from the parent, electroplating the daughter on a suitable substrate, and holding the electroplated daughter until the daughter decays to the fissionable deposit.

DETAILED DESCRIPTION OF THE PREFERRED EMBODIMENTS

One embodiment of the method of the present invention will now be described which is directed to producing a fissionable deposit of isotopically pure $^{239}$Pu.

According to this embodiment, isotopically pure $^{243}$Am is used as a radioactive parent source to prepare an isotopically pure $^{239}$Np daughter. Preferably, the parent is a nuclide that decays by beta emission and has a half-life shorter than the daughter. An important consideration in determining the parent source is the ultimate daughter of which a low-mass fissionable deposit is sought.

The radioactive parent source is held until it reaches secular equilibrium with the daughter formed thereby. That is, $^{243}$Am decays according to the following Equation (1):

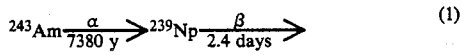
(1)

The $^{239}$Np daughter grows into radioactive secular equilibrium with the $^{243}$Am parent following a 2.4 day half-life for the ingrowth.

Then, the parent source is separated from the daughter. That is, Np and Am are easily separated chemically, allowing the $^{243}$Am to be "milked" as known in the art as a source of the isotopically pure $^{239}$Np. "Milking" is used to describe a separation of two isotopes that is followed by a further daughter isotope ingrowing back into the source thereof which is the daughter isotope as separated by the milking from the original parent. As described above, a daughter $^{239}$Np is formed by the decay of the parent $^{243}$Am, wherein the daughter Np is formed in the source by the decay of the parent Am.

In this case, the milking is preferably performed via an ion exchange column. More particularly, $^{243}$Am is absorbed on an ion exchange column in which a change in acidity can be used, wherein the Np is washed out of the column and the Am remains in the column, thus providing the milking.

The $^{239}$Np decays to the further daughter $^{239}$Pu, allowing the $^{239}$Np isotope to be used as a source of isotopically pure $^{239}$Pu. That is, the Np daughter is electroplated using, e.g., a dimethylsulfoxide solvent on a suitable substrate such as a high purity metal; nickel is preferred. Electroplating techniques are known in the art for this purpose.

More particularly, $^{239}$Np in an amount of $1.36 \times 10^5$ dpm produced as described above is electroplated on a substrate. The decay rate can be easily characterized by known radiometric means. A waiting period of many $^{239}$Np half-lives is allowed to pass, i.e., several weeks. As a result, $2.8 \times 10^{-13}$ gram for instance of isotopically pure $^{239}$Pu can be formed by the complete decay of the $^{239}$Np isotopic spike.

Another embodiment of the method of the present invention will now be described, directed to producing isotopically pure $^{237}$Np. According to this embodiment, isotopically pure $^{241}$Pu is used as the radioactive parent source for producing an isotopically pure $^{237}$U daughter. That is, $^{241}$Pu decays according to the following Equation (2):

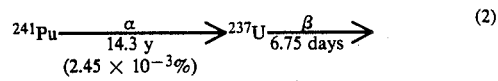
(2)

The $^{237}$U daughter grows into radioactive secular equilibrium with the $^{241}$Pu parent following a 6.75 day half-life for the ingrowth. U and Pu are easily separated chemically, allowing the $^{241}$Pu to be milked as described above as a source of isotopically pure $^{237}$U. Since $^{237}$U decays to $^{237}$Np, the $^{237}$U isotope is a source of isotopically pure $^{237}$Np.

More particularly, $^{237}$U in an amount for instance of of $1.8 \times 10^6$ dpm is electroplated on a substrate. Again, the decay rate can be easily characterized by known radiometric means. The sufficient waiting period of several weeks, namely of many $^{237}$U half-lives, is allowed to pass. $^{237}$Np in the amount of $10^{-11}$ gram is accordingly formed by the complete decay of the $^{237}$U isotopic spike.

The only known disadvantage of the latter embodiment described above results from the fact that the $^{237}$U spike must be chemically pure prior to each electroplating session, since the $^{237}$Np formed by previous decays will also undergo electroplating. Conventional electroplating operating conditions would require an initial Np-U chemical separation on the $^{237}$U spike material followed by production of the deposits in the ensuing few hours. This is a small disadvantage when compared with the method described supra in the Backgound of the Invention, namely, requiring $^{239}$Np-$^{237}$Np spike equilibration.

The ultralow-mass fissionable deposits produced by this method can then be used as fissioning sources for solid state track recorder fission rate measurements in high intensity neutron fields to derive information for neutron dosimetry purposes.

More particularly, a solid state track recorder may be placed adjacent to a thin fissionable deposit produced by the present invention. The solid state track recorder then records tracks from the recoiling fission fragments which result from the fissions in the deposit. The fissionable deposit is then exposed to a neutron fluence for a predetermined period. The value of the neturon fluence can then be determined based on the number of fissions of the fissionable deposit. More particularly, the number of tracks formed by the fissionable deposit and observed with an optical microscope after chemical etching of the solid state track recorder is proportional to the number of fissions that has occurred in the fissionable deposit. Thus, the number of fission fragment tracks per square centimeter, namely, the track density in the solid state track recorder, is used to calculate the fission rate per unit area in the fissionable deposit.

The most important advantages of this method for producing $^{239}$Pu and $^{237}$Np deposits as compared to other methods are as follows:

(1) the decay rates are much higher, thus allowing easier deposit characterization;
(2) the resulting material in the deposit is isotopically pure;
(3) detector background is no longer a problem;
(4) chemical equilibrations of tracers or spikes are no longer necessary;
(5) extremely low masses, i.e., as low as $10^{-13}$ g for $^{237}$Np and $10^{-16}$ g for $^{239}$Pu, can be produced; and
(6) the time savings that accrue from using this method are substantial.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, as falling within the scope of the invention and the appended claims and their equivalents.

I claim:

1. A method for producing an isotopically pure, ultra-low-mass fissionable deposit which can be accurately calibrated and used as a nuclear reactor dosimeter, comprising the steps of:
   (a) holding a radioactive parent until the radioactive parent reaches secular equilibrium with a daughter formed by the radioactive decay of the parent;
   (b) chemically separating the daughter from the parent;
   (c) electroplating the daughter on a substrate;
   (d) accurately determining the amount of daughter present by measuring its decay rate; and
   (e) holding the electroplated daughter until the daughter decays to the ultralow-mass fissionable deposit whose mass shall then be known since the amount of the daughter was previously determined.

2. A fissionable deposit prepared by the method of claim 1, wherein the fissionable deposit is effectively isotopically pure.

3. A method of using an electroplated fissionable deposit as a nuclear reactor dosimeter, comprising the steps of:
   (a) holding a radioactive parent until the radioactive parent reaches secular equilibrium with a daughter formed by the radioactive decay of the parent;
   (b) chemically separating the daughter from the parent;
   (c) electroplating the daughter on a substrate;
   (d) accurately determining the amount of daughter present by measuring its decay rate;
   (e) holding the electroplated daughter until the daughter decays to the ultralow-mass fissionable deposit whose mass shall then be known since the amount of the daughter was previously determined;
   (f) combining the fissionable deposit with a solid state track recorder;
   (g) exposing the fissionable deposit to a neutron fluence; and
   (h) determining the value of the neutron fluence based on the number of fissions of the fissionable deposit.

4. A fissionable deposit prepared by the method of claim 3, wherein the fissionable deposit is effectively isotopically pure.

5. The method as recited in claim 3 wherein step (a) comprises the substep of:
   choosing the parent from the group consisting of $^{243}$Am and $^{241}$Pu.

6. The method as recited in claim 3, wherein the daughter is $^{239}$Np.

7. The method as recited in claim 3, wherein the daughter is $^{237}$U.

8. The method as recited in claim 3, wherein the fissionable deposit is $^{239}$Pu.

9. The method as recited in claim 3, wherein the fissionable deposit is $^{237}$Np.

* * * * *